T. G. BELL.
Rigging Stoppers.
No. 145,833.  Patented Dec. 23, 1873.
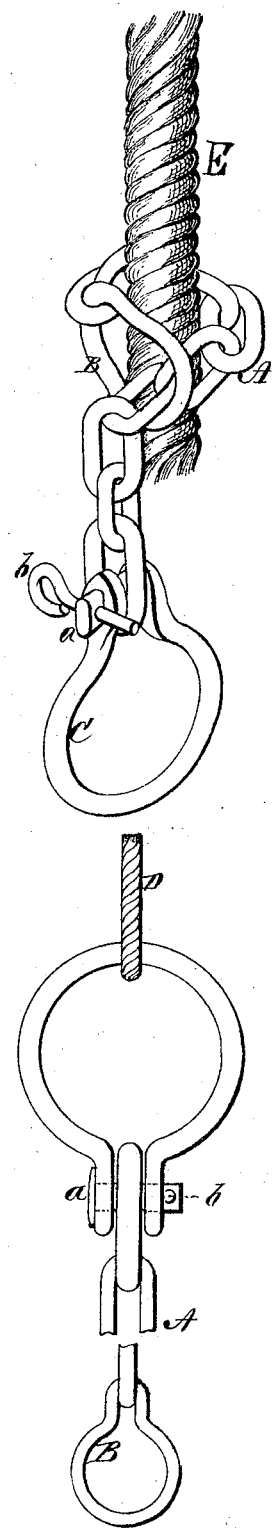
Witnesses
John A. Ellis
C. Alexander
Inventor
Thomas G. Bell
per
C. H. Watson & Co
atty's

UNITED STATES PATENT OFFICE.

THOMAS G. BELL, OF BROOKLYN, NEW YORK, ASSIGNOR TO JOSEPH J. WALTON, OF NEW YORK CITY.

IMPROVEMENT IN RIGGING-STOPPERS.

Specification forming part of Letters Patent No. 145,833, dated December 23, 1873; application filed April 22, 1873.

*To all whom it may concern:*

Be it known that I, THOMAS G. BELL, of Brooklyn, in the county of Kings and State of New York, have invented certain new and useful Improvements in Rigging-Stoppers; and I do hereby declare that the following is a full, clear, and exact description thereof, reference being had to the accompanying drawings and to the letters of reference marked thereon, which form a part of this specification.

The invention has for its object to furnish an improved device for the temporary setting up or attaching the two ends of a rope that has been shot away or stranded, or that, from other cause, has become separated; and it consists in a set of chains provided with shackles and links of peculiar construction, to be used in connection with a lanyard and blocks, as hereinafter more fully described.

In order to enable others skilled in the art to construct and use the same, I will now proceed to describe it, referring to the annexed drawings, in which the figure is a view of my improved device.

A represents chains of like form, each provided, at one end, with a ring-link, B, said ring-links being of just sufficient size at their largest ends to permit the chain to pass through, and the said ring-link is bent to correspond to the shape of the rope E as nearly as possible, so that when drawn around the rope, and the chain passing through the link, as shown in the figure, the chain will bite the rope and be held secure thereon. This ring-link is therefore made as small as possible and admit the chain to pass through. At the other end of the chains it is necessary to have a device of sufficient capacity to allow the chains to be used for the purpose intended; and said device must be made detachable from the chain, as a device of sufficient capacity would not pass through the ring-link B. A shackle, C, is therefore detachably secured to the chain A by means of the key *a* and pin *b*, by which arrangement the shackle may be of the desired size.

In use, each of the chains are placed one around either end of the broken or stranded ends of the rope, and, by means of a lanyard, D, and the ordinary tackle-block, or other equivalent device, the ropes E may be drawn in proper position and held securely in place until such time as they can be properly repaired.

I am aware that trace and log chains with rings and links and hooks have been used of various forms; and I do not, therefore, claim such device, as such devices will in no manner accomplish the same purpose as my improved rigging-stopper; but

Having thus fully described my invention, what I do claim, and desire to secure by Letters Patent, is—

The chains A, provided with the small ring-links B bent to conform to the shape of the rope, the shackles affording means for attaching the ordinary tackle and for securing the parts by the use of lanyard D, all constructed and arranged as and for the purpose specified.

In testimony that I claim the foregoing as my own I affix my signature in presence of two witnesses.

T. G. BELL.

Witnesses:
WILLIAM PHIPPS,
JOHN PETERS.